M. P. MILLER.
SCALE RULE.
APPLICATION FILED MAR. 14, 1916.
1,219,836.
Patented Mar. 20, 1917.
2 SHEETS—SHEET 1.
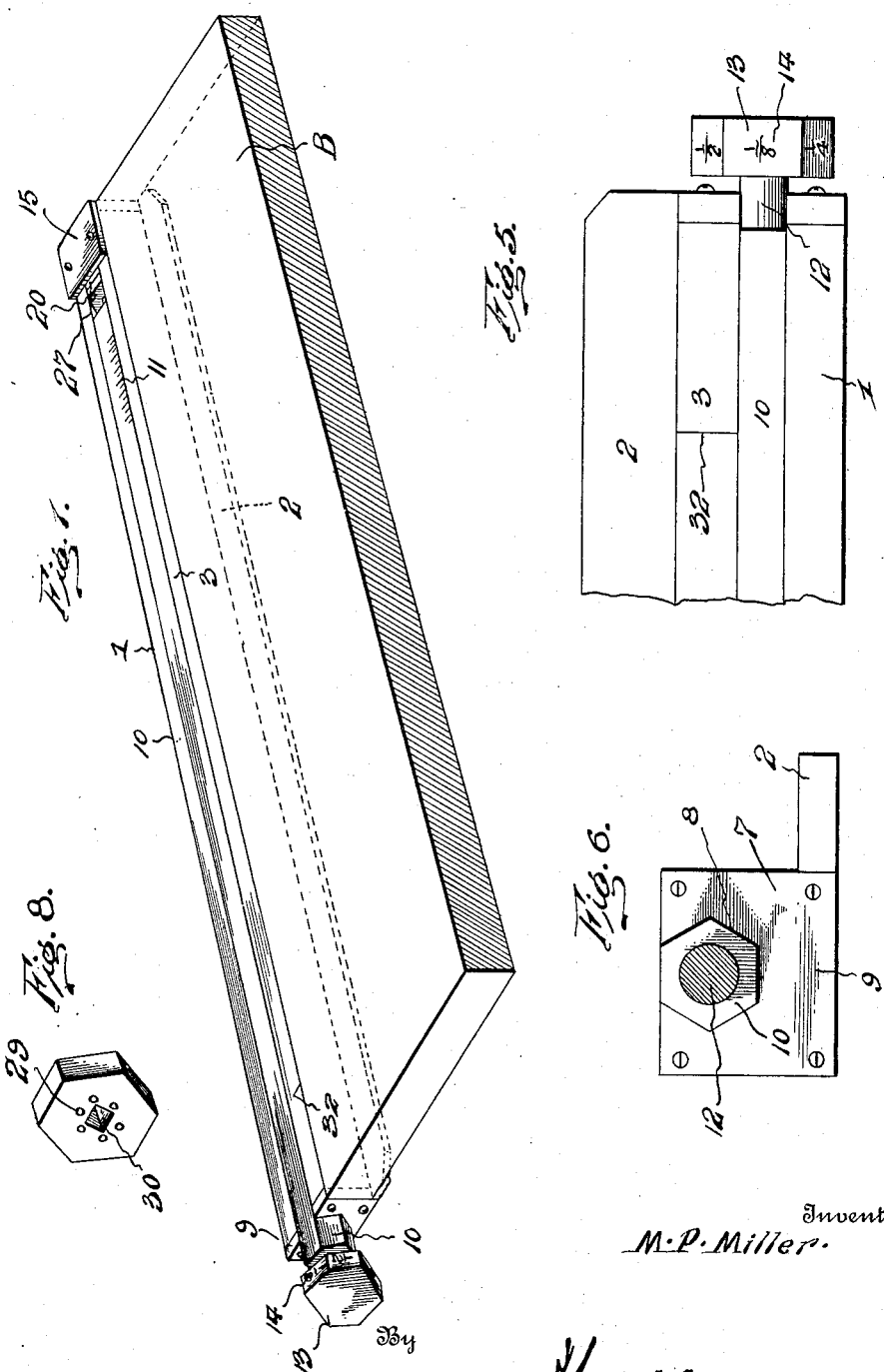

M. P. MILLER.
SCALE RULE.
APPLICATION FILED MAR. 14, 1916.
1,219,836.
Patented Mar. 20, 1917.
2 SHEETS—SHEET 2.
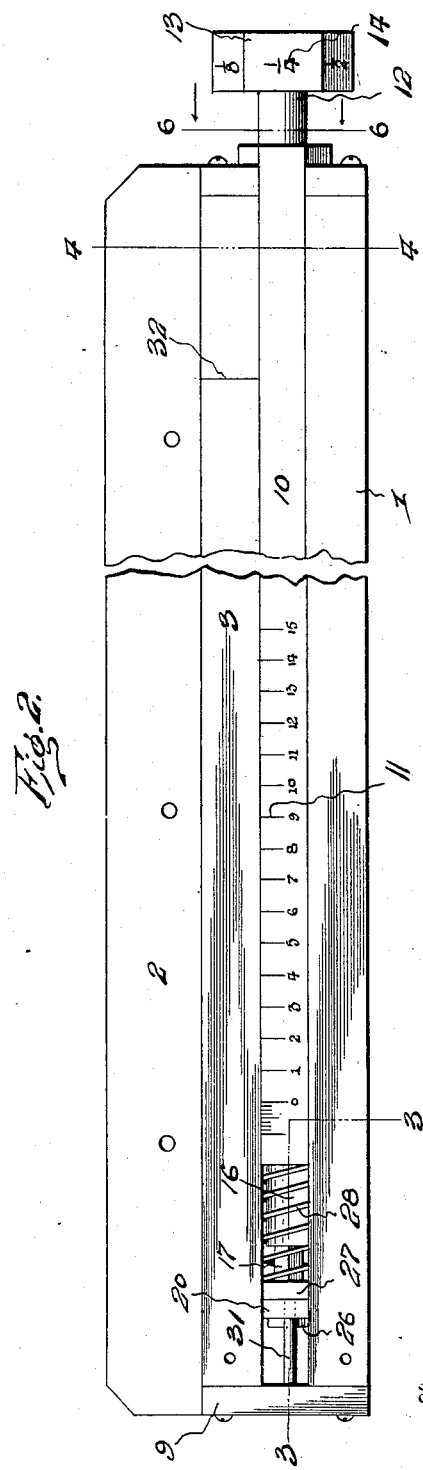
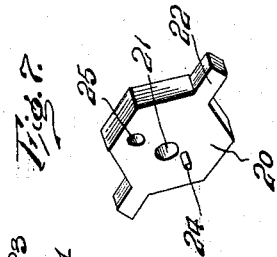
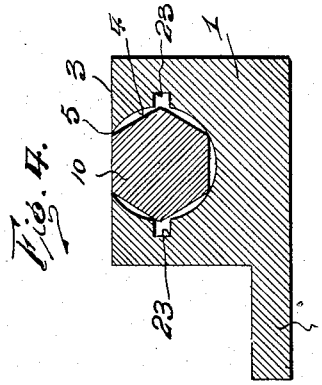
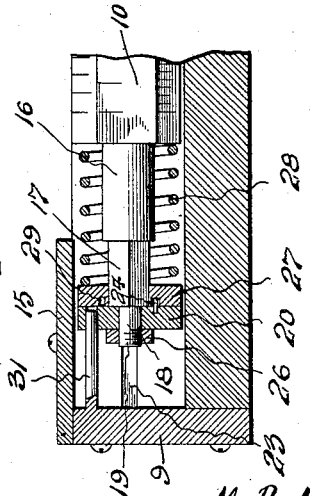
Inventor
M. P. Miller.
By
Attorneys.

UNITED STATES PATENT OFFICE.

MILTON P. MILLER, OF WATERVLIET, NEW YORK.

SCALE-RULE.

1,219,836.  Specification of Letters Patent.  Patented Mar. 20, 1917.

Application filed March 14, 1916. Serial No. 84,137.

*To all whom it may concern:*

Be it known that I, MILTON P. MILLER, a citizen of the United States, residing at Watervliet, in the county of Albany and State of New York, have invented certain new and useful Improvements in Scale-Rules, of which the following is a specification.

This invention relates to scale rules and has as its object to provide a scale rule which will prove highly acceptable to mechanical and architectural draftsmen and will enable such draftsmen to correctly and expeditiously prepare drawings to scale without the necessity of making repeated calculations likely to result in error.

Another aim of the invention is to provide a scale rule which may be applied to any ordinary drawing board and which when in place may be readily manipulated so as to obtain the desired measurements in making drawings to scale.

The invention further aims to provide a scale rule so constructed that the scales thereof may be readily and quickly selectively brought into use as may be desired and which rule after adjustment will not be liable to become accidentally disarranged so as to present some scale other than the one intended to be used.

The invention embodies a polygonal slide having different scales upon its faces, the slide being mounted in a casing which is to be secured to a drawing board, and the invention aims to provide novel means for locking the slide against rotation after it has been adjusted to present to view the face bearing the desired scale.

In the accompanying drawings:

Figure 1 is a perspective view of the scale rule embodying the present invention applied to a drawing board.

Fig. 2 is a top plan view of the scale rule, a portion of the casing being removed and the rule being shown detached from the drawing board.

Fig. 3 is a longitudinal sectional view in detail on the line 3—3 of Fig. 2.

Fig. 4 is a vertical transverse sectional view on the line 4—4 of Fig. 2.

Fig. 5 is a plan view of one end of the rule illustrating the position which the slide is caused to assume when it is desired to rotate the same to cause the desired scale to be presented for use.

Fig. 6 is a vertical transverse sectional view on the line 6—6 of Fig. 2.

Fig. 7 is a perspective view of one of the members of the locking device for the slide.

Fig. 8 is a similar view of the other one of the said members.

As before stated, the scale rule embodying the present invention includes a slide and a casing in which the slide is mounted and this casing comprises a body 1 provided at one side at its bottom with a longitudinally extending flange 2 designed to be secured in any suitable manner as for example by screws, to the under side of a drawing board which in Fig. 1 is indicated by the reference character B. The casing 1 has a plain upper face or side indicated by the numeral 3 and is formed with a longitudinally extending channel 4 which is substantially cylindrical, the wall of the channel when the casing is viewed in cross section, describing a circle cut by the plane of the upper face of the body 1. It will be apparent, therefore, that the channel opens through the upper face of the said body or, in other words, that the body is provided in its upper face with a slot 5 which communicates with the channel. The casing at one end, or more specifically, its right hand end, has secured to it a cap plate 7 having a polygonal opening 8 formed therein. The upper edge of this plate is flush with the upper face of the body 1 and while the wall of the opening 8 may have any desired number of sides it is here illustrated as embodying five sides, the sixth side of the opening being open, or in other words, bounded by the plane of the upper edge of the said cap plate 7. Therefore, in effect the opening 8 is hexagonal and, as will be presently explained, the slide is in cross section of the same shape and is slidably fitted within the said opening. The opposite end of the casing 1 has secured to it a cap plate indicated by the numeral 9 and this plate closes the last mentioned or corresponding end of the channel 4. At this point it may be stated that when the casing is secured to the drawing board its upper face 3 will be flush with the upper surface of the said board and the upper side of the channel 4 or, in other words, the slide 5 will be parallel to that edge of the board against which the rule is disposed.

The slide which is mounted within the channel 4 comprises a body 10 which is here illustrated as hexagonal and is provided upon its several faces with scales 11 which may, for example, be employed in making drawings to the scale of one-eighth of an inch to the foot, one-fourth of an inch to the foot, etc. It will be understood that the slide may embody more than six faces and that the arrangement of the scales is an arbitrary one, consideration being had for the use to which the rule is intended to be put. By reference to Fig. 4 of the drawings it will be observed that the slide 10 has its corners between its several faces touching or substantially touching the circle described by the wall of the channel 4 and that, therefore, the slide may have rotary as well as sliding adjustment within the said channel. On the other hand, it will be observed by reference to Fig. 6 of the drawings, that the slide fits snugly within the opening 8 and that when its body portion is received within this opening it will be held against rotary adjustment within the channel although capable of ready adjustment longitudinally of the channel. That end of the slide 10 which is adjacent the end 7 of the casing is reduced in diameter to form a cylindrical stem 12 and a polygonal head 13 which latter has its faces corresponding in number to the faces of the slide and parallel to the planes occupied by the said faces. Each face of the head 13 bears numerals or other data as indicated at 14, indicating the character of the scale upon the corresponding face of the slide 10 and thus, for example, when that scale upon the slide 10 is uppermost or, in other words, presented at the slot 5, through the use of which scale a drawing may be made to the scale of one-fourth of an inch to the foot, this fact will be clearly indicated upon that face of the head 13 which is uppermost. The slide 10 is of less length than the channel 4 and it will now be understood that when the slide is slid to the left in Fig. 2 of the drawings, so as to assume substantially the position shown in Fig. 5 of the drawings, the stem 12 will be located within the opening 8 and being of a diameter less than the opening, the slide may be bodily rotated within the channel 4 through the medium of the head 13 so as to bring to position within the slot 5 that face of the slide 10 which bears the scale desired to be used. It will further be understood that when the slide is again moved to the right, as illustrated in Fig. 2 of the drawings, its polygonal body portion will fit within the opening 8 and while the slide may then be adjusted longitudinally within the channel 4, it is held against rotation.

A cap plate 15 is secured upon the upper side of the body 1 at the left hand end thereof and closes this end of the channel 4 completing the housing for the elements of a means which is provided for holding the slide against rotation within the channel while in actual use. That end of the slide 10 opposite the end on which the stem 12 is formed, is reduced to form a rounded extension indicated by the numeral 16 and beyond this extension the body of the slide is further reduced to form a polygonal portion 17 preferably rectangular in cross section. Beyond the portion 17 the body of the slide is further reduced to form a stud 18 which is cylindrical and threaded at its extremity, as indicated by the numeral 19. Fitted upon the stud 18 inwardly of the threaded end 19 thereof, is a polygonal locking member 20, the said member being provided centrally with an opening 21 rotatably receiving the said stud 18. At diametrically opposite points the member 20 is provided with lugs 22 which project laterally therefrom and fit slidably within grooves 23 formed in the opposite sides of the wall of the channel 4. Upon one face the locking member 20 is provided with a stud 24 which in the present instance is located below the opening 21 and the said member is also formed with an opening 25 preferably located above the opening 21. A nut 26 is threaded upon the stud 18 and serves to retain the member 20 upon the said stud although this nut is not adjusted so as to bind the member or interfere with rotation of the slide 10 with relation to the said member. It will be understood at this point that the locking member 20 is held against rotation within the channel 4 by reason of the engagement of its lugs 22 in the grooves 23. The numeral 27 indicates another locking member which is slidably fitted upon the polygonal portion 17 of the slide 10 and which is normally held in position resting against the member 20 by means of a spring 28 which is fitted to the portion 16 of the said slide and bears at one end against the body of the slide and at its other end against the said locking member 27. The locking member 27 is also polygonal and is formed in one face with a series of sockets 29 which surround the rectangular opening 30 formed in the said member and which opening receives the portion 17 of the slide. The sockets 29 are arranged in an annular series and by reference to Fig. 3 of the drawings it will be observed that the stud 24 is adapted to seat interchangeably in the said sockets 29. The cap plate 9 is formed or provided with a pin 31 which projects into the channel 4 and at its end into the opening 25 in the locking member 20.

Assuming the members to be in the position shown in Figs. 2 and 3 of the drawings and that it is desired to rotatably adjust the slide 10 so as to present for use a certain one of the scales 11, the head 13 is grasped and pressure is exerted thereagainst toward the left in Fig. 2 of the drawings. As the end of the portion 17 of the slide 10 bears against the locking member 20, this member will be moved in a corresponding direction as also the locking member 27 which is held yieldably against the member 20 by the spring 28 as before described. However, as the parts are thus moved the end of the pin 31 will engage against the locking member 27 and limit its movement toward the left in the said figures against the tension of the said spring 28. As the movement is continued the stud 24 will be brought out of engagement in that one of the sockets 29 in which it was seated and after such disengagement of the stud from the said socket the slide 10 may be rotated through the medium of the head 13 to secure the desired adjustment. After the desired scale has been brought into position for use the head 13 is relieved of pressure and the spring 28 will then return the slide 10 to its initial position and the stud 24 will again seat in one of the sockets 29, thereby holding the locking members 20 and 27 against relative rotation and inasmuch as the member 27 is held for rotation with the slide 10 and the locking member 20 is held against rotation within the channel 4, the slide itself will be held against accidental rotation as will be readily understood. It will, of course, be understood that the slide may be adjusted longitudinally within the channel without in any way disturbing the adjustment of the elements of the locking device just described.

While the member 16 is above described as forming an integral part of the slide 10, it will be understood that the same may be formed separate from the slide and threaded into or otherwise secured to the end of the slide.

By reference to Fig. 2 of the drawings it will be observed that the face 3 of the body 1 of the casing is provided with a mark, indicated at 32, and in the use of the rule the T-square is to be brought into registration with this mark and a line drawn upon the paper with relation to which line all measurements are to be made and distances pointed off.

Having thus described the invention, what is claimed as new is:

1. The combination of a casing, a slide having a plurality of scale faces and mounted in the casing for rotating and longitudinal sliding motion, and means housed within the casing and carried by the slide and the casing to lock the slide against movement.

2. In an instrument of the class described, a slide having a plurality of scale faces, a member slidably and rotatably supporting the slide, a locking member slidable with relation to the first mentioned member and held against rotation with relation thereto, and a locking member carried by the slide and arranged for coöperation with the first mentioned locking member.

3. In an instrument of the class described, a slide having a plurality of scale faces, a member slidably and rotatably supporting the slide, a locking member slidable with relation to the first mentioned member and held against rotation with relation thereto, a locking member carried by the slide and arranged for coöperation with the first mentioned locking member, and means arranged in the movement of the slide in one direction to separate the said locking members.

4. In an instrument of the class described, a slide having a plurality of scale faces, a member slidably and rotatably supporting the slide, a locking member slidable with relation to the first mentioned member and held against rotation with relation thereto, a locking member carried by the slide and arranged for coöperation with the first mentioned locking member, means arranged in the movement of the slide in one direction to separate the said locking members, and means yieldably holding the locking members in coactive engagement with each other.

5. In an instrument of the class described, a slide having a plurality of scale faces, a member slidably and rotatably supporting the slide, a locking member carried by the slide and slidably adjustable therewith, the said slide being rotatable with relation to the said member, means for holding the locking member against rotation with relation to the supporting member, a locking member carried by the slide and normally coacting with the first mentioned locking member, the second mentioned locking member being held for rotation with the slide, and means whereby the locking members may be rendered non-coactive.

6. In an instrument of the class described, a slide having a plurality of scale faces, a member slidably and rotatably supporting the slide, a locking member with relation to which the slide is rotatable, the locking member being non-rotatable with relation to the supporting member, a locking member carried by the slide, coacting locking elements upon the two members, means yieldably holding the members in coactive engagement, and means upon the supporting member whereby the said locking members may be rendered non-coactive.

7. In an instrument of the class described, a polygonal slide, a member slidably and rotatably supporting the slide, the said member having a channel within which the slide is received and the said channel being provided in one end wall with a polygonal opening, the walls of which opening by coöperation with the faces of the slide constitute means for holding the slide against rotation, the slide being provided at one end with a stem of a diameter less than the diameter of the said opening, and means whereby the slide may be slidably adjusted and moved to position to bring its said stem within the opening whereby to permit of rotary adjustment of the slide.

In testimony whereof I affix my signature.

MILTON P. MILLER. [L. S.]

Copies of this patent may be obtained for five cents each, by addressing the "Commissioner of Patents, Washington, D. C."